US007747874B2

(12) United States Patent
Goodwill et al.

(10) Patent No.: US 7,747,874 B2
(45) Date of Patent: Jun. 29, 2010

(54) SINGLE COMMAND PAYLOAD TRANSFERS BLOCK OF SECURITY FUNCTIONS TO A STORAGE DEVICE

(75) Inventors: William Goodwill, Edmond, OK (US); Thomas Scwartzkopf, Loveland, CO (US); Robert Thibadeau, Pittsburgh, PA (US); John Nestor, Issaquah, WA (US)

(73) Assignee: Seagate Technology LLC, Scotts Valley, CA (US)

( * ) Notice: Subject to any disclaimer, the term of this patent is extended or adjusted under 35 U.S.C. 154(b) by 1298 days.

(21) Appl. No.: 11/143,862

(22) Filed: Jun. 2, 2005

(65) Prior Publication Data

US 2006/0288237 A1  Dec. 21, 2006

(51) Int. Cl.
*G06F 11/30* (2006.01)
(52) U.S. Cl. .......................... 713/193; 713/189; 726/9
(58) Field of Classification Search .................. None
See application file for complete search history.

(56) References Cited

U.S. PATENT DOCUMENTS

| 6,182,222 | B1* | 1/2001 | Oparaji | 726/17 |
|---|---|---|---|---|
| 6,714,921 | B2 | 3/2004 | Stefik et al. | 705/55 |
| 6,854,063 | B1* | 2/2005 | Qu et al. | 726/13 |
| 7,231,662 | B2* | 6/2007 | Wissenbach | 726/4 |
| 7,363,390 | B2* | 4/2008 | Quinn et al. | 710/5 |
| 7,502,946 | B2* | 3/2009 | Perkins et al. | 713/193 |
| 2004/0030796 | A1 | 2/2004 | Cooper et al. | 709/231 |
| 2004/0103324 | A1 | 5/2004 | Band | 713/202 |
| 2004/0103415 | A1 | 5/2004 | Zuppicich | 719/310 |
| 2004/0107237 | A1 | 6/2004 | Kashiwada | 709/200 |
| 2004/0107356 | A1 | 6/2004 | Shamoon et al. | 713/193 |
| 2004/0107383 | A1 | 6/2004 | Bouchier et al. | 714/4 |
| 2005/0268114 | A1* | 12/2005 | Thibadeau | 713/189 |
| 2005/0289347 | A1* | 12/2005 | Ovadia | 713/171 |
| 2006/0161784 | A1* | 7/2006 | Hunter et al. | 713/182 |
| 2006/0288237 | A1* | 12/2006 | Goodwill et al. | 713/193 |

* cited by examiner

*Primary Examiner*—Pramila Parthasarathy
(74) *Attorney, Agent, or Firm*—Kirk A. Cesari; Westman, Champlin & Kelly, P.A.

(57) ABSTRACT

A storage device has a storage medium and a processor. The processor is disposed within the storage device and is adapted to receive multiple commands as a command block over an interface. The processor is adapted to extract each of the multiple commands from the single block for execution on the storage device.

15 Claims, 11 Drawing Sheets

| BYTE\BIT | 7 | 6 | 5 | 4 | 3 | 2 | 1 | 0 | COMMENT |
|---|---|---|---|---|---|---|---|---|---|
| 0 | LENGTH | | | | | | | | SUPER PACKET HEADER |
| 1 | | | | | | | | | |
| 2 | DATA | | | | | | | | SUPER PACKET PAYLOAD |
| ... | | | | | | | | | |

*FIG. 2A*

| BYTE\BIT | 7 | 6 | 5 | 4 | 3 | 2 | 1 | 0 | COMMENT |
|---|---|---|---|---|---|---|---|---|---|
| 0 | SESSION | | | | | | | | PACKET HEADER |
| 1 | | | | | | | | | |
| 2 | | | | | | | | | |
| 3 | | | | | | | | | |
| 4 | LENGTH | | | | | | | | |
| 5 | | | | | | | | | |
| 6 | DATA | | | | | | | | PACKET PAYLOAD |
| ... | | | | | | | | | |

*FIG. 2B*

| BYTE\BIT | 7 | 6 | 5 | 4 | 3 | 2 | 1 | 0 | COMMENT |
|---|---|---|---|---|---|---|---|---|---|
| 0 | FLAG | KIND | | | | | | | SUBPACKET HEADER |
| 1 | | | | | | | | | |
| 2 | LENGTH | | | | | | | | |
| 3 | | | | | | | | | |
| 4 | DATA | | | | | | | | SUBPACKET PAYLOAD |
| ... | TOKENIZED DATA STRING | | | | | | | | |

*FIG. 2C*

| BYTE \ BIT | 7 | 6 | 5 | 4 | 3 | 2 | 1 | 0 | COMMENT |
|---|---|---|---|---|---|---|---|---|---|
| 0 | \multicolumn{8}{c|}{LENGTH} | SUPER PACKET HEADER |
| 1 | | | | | | | | | |
| 2 | \multicolumn{8}{c|}{SESSION} | PACKET HEADER |
| 3 | | | | | | | | | |
| 4 | | | | | | | | | |
| 5 | | | | | | | | | |
| 6 | \multicolumn{8}{c|}{LENGTH} | |
| 7 | | | | | | | | | |
| 8 | \multicolumn{8}{c|}{KIND} | SUBPACKET HEADER |
| 9 | | | | | | | | | |
| 10 | \multicolumn{8}{c|}{LENGTH} | |
| 11 | | | | | | | | | |
| 12 | \multicolumn{8}{c|}{DATA} | SUBPACKET PAYLOAD |
| ... | | | | | | | | | |

*FIG. 3*

| WORD \ BYTE | 3 | 2 | 1 | 0 | COMMENT |
|---|---|---|---|---|---|
| 0 | \multicolumn{2}{c|}{0X8004} | \multicolumn{2}{c|}{4} | SUBPACKET HEADER |
| 1 | STATUS | | CREDIT | | SUBPACKET PAYLOAD |

*FIG. 4*

SINGLE COMMAND PAYLOAD TRANSFERS BLOCK OF SECURITY FUNCTIONS TO A STORAGE DEVICE

FIELD OF THE INVENTION

The present invention relates to command processing on a storage device, and more particularly, to a methodology for processing multiple commands contained in a single data block using a processor disposed on the storage device.

BACKGROUND OF THE INVENTION

Disc drive and other storage subsystems, including flash memory devices and removable storage devices, typically have a processor (sometimes called a microprocessor) in their built-in electronics. The processor can be used to hide computations as well as stored data.

SmartCards are a type of storage device that is commonly limited to single security sessions and to simple sequences of operations. As used herein, the term "SmartCard" refers to card with updatable memory and often with an embedded microprocessor. A smartcard may be used in a variety of ways. One use is to initialize the card with a monetary value for use in financial transactions, such as paying for telephone calls or for conducting Internet transactions. With respect to storage devices, SmartCards can also be utilized as a physical access key for unlocking a storage device.

A storage device-based implementation can potentially have a large number of security partitions and can handle multiple, simultaneous security sessions to those security partitions. As used herein, the term "security partition" refers to a data area defined on a storage medium of the storage device to which access is strictly controlled. A "security session" is a secure transaction using, for example, encryption, tunneling, or secure socket layer type communication protocols, between the security partition and an entity.

Though the storage device typically has more capabilities than a SmartCard, the storage device is still limited by the command set that can be sent from a host machine to the storage device. In one sense, if the host transmits only one command at a time to a storage device (in a manner similar to a typical SmartCard session), the capabilities of the storage device are not fully realized. Additionally, latencies associated with access time (the time interval from a start of a memory read until the insertion of the memory completion signal) and cycle time (the minimum time interval from the start of a read or write operation to the start of the next memory operation) are made worse. Typically, the cycle time may be slightly longer than the access time due to various hardware housekeeping tasks that are performed by the memory.

Some memory devices read or write values not as individual words, but in blocks of multiple words. In these memory systems, there is a latency in accessing the first word of the block that is different from the bandwidth (the rate at which the words can be transmitted in words per second) once the first word of the block is available.

Because the latency in accessing the first word in a block is cumulative with the rate at which words can be transferred, it is desirable to reduce first-word latencies in order to minimize delays. Such latencies typically occur in communications between a host system and a storage subsystem.

There is an ongoing need for improved communications between host systems and the storage subsystem. More particularly, there is an on-going need for improving communications, including commands and transactions directed to particular security sessions, between the host and the storage subsystem that hosts the transactions.

SUMMARY OF THE INVENTION

A storage device has a storage medium and a processor. The processor is disposed within the storage device and is adapted to receive multiple commands as a single block over an interface. The processor is adapted to extract each of the multiple commands from the single block for execution on the storage device.

In one embodiment, a method for processing commands on a storage device is described. A command block is received on the storage device over an interface from an external device. The command block is formed from a plurality of commands. Each of the plurality of commands is extracted from the command block using a command processor of the storage device.

In another embodiment, a storage device has a storage medium and a processor. The storage medium has one or more security partitions. The processor is disposed within the storage device and is adapted to extract single commands from a command block formed from a plurality of commands. The processor is adapted to process each single command on security sessions associated with the one or more security partitions.

Other features and benefits that characterize embodiments of the present invention will be apparent upon reading the following detailed description and review of the associated drawings.

BRIEF DESCRIPTION OF THE DRAWINGS

FIG. 2A is a table illustrating elements of a superpacket according to an embodiment of the present invention.

FIG. 2B is a table illustrating elements of a packet according to an embodiment of the present invention.

FIG. 2C is a table illustrating elements of a subpacket according to an embodiment of the present invention.

FIG. 3 is a table illustrating headers as sent via a single router packet according to an embodiment of the present invention.

FIG. 4 is a table illustrating a method status subpacket according to an embodiment of the present invention.

DETAILED DESCRIPTION OF ILLUSTRATIVE EMBODIMENTS

Figure 1:
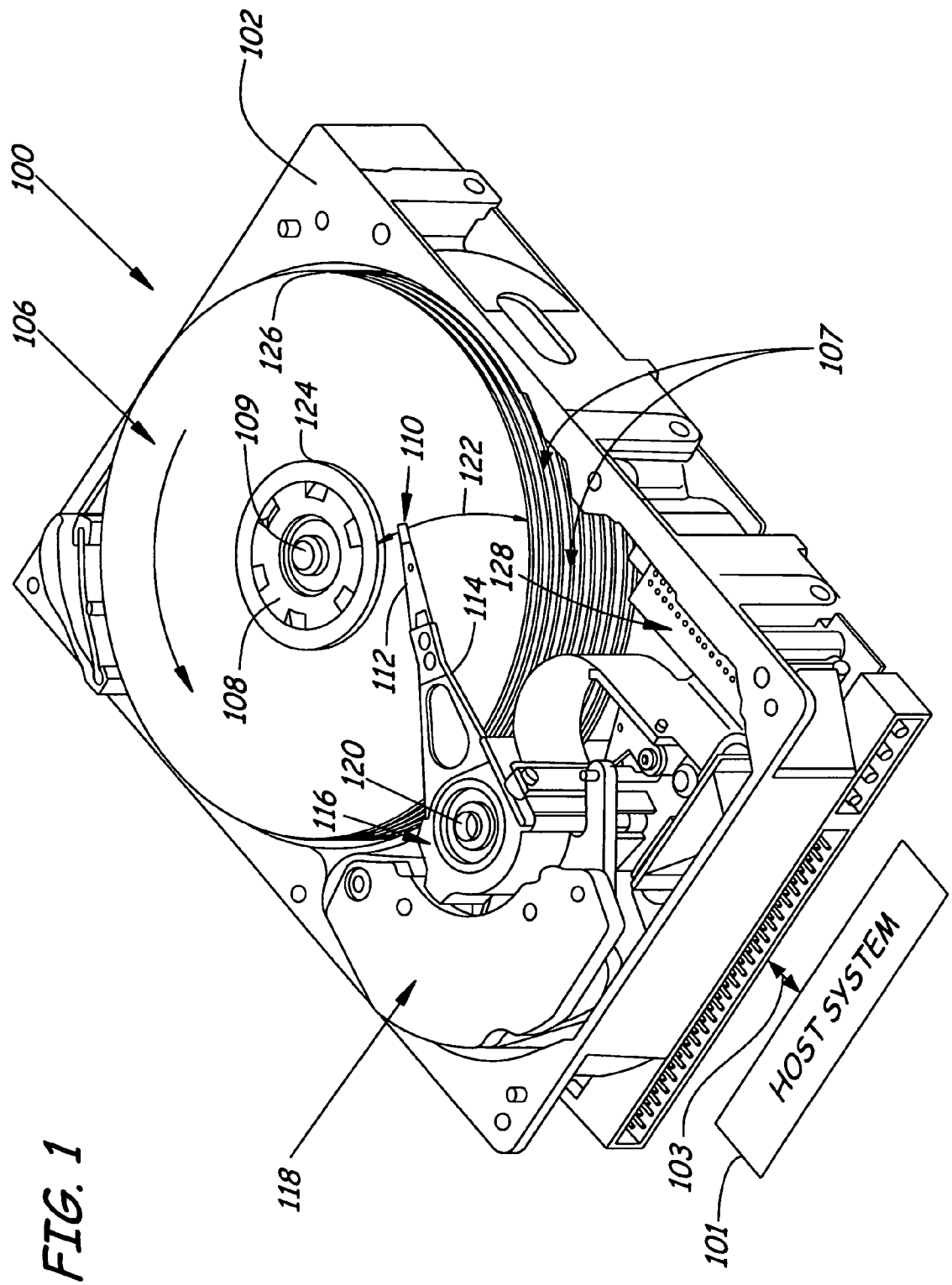
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110, which is mounted to disc drive 100 for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads disposed on sliders 110 over a desired data track along an arcuate path 122 between a disc inner diameter 124 and a disc outer diameter 126. Voice coil motor 118 is driven by servo electronics 130 based on signals generated by heads disposed on sliders 110 and a host system 101 via interface 103.

A command set and transmission protocol on the storage subsystem for utilizing a complex set of capabilities of a storage subsystem-based security partition or drive card set is described. A session manager is adapted to open and manage multiple sessions simultaneously. The command processor is adapted to parse a series of commands related to transactions on the security partitions or drive card set. A facility is provided to execute remote procedure calls on the drive. The command set and transmission protocol receives a single command payload transferred from the host to the drive and processes the series of commands from the single payload.

It will be understood by a worker skilled in the art that the present invention is applicable to any memory system adapted to host security sessions, including the disc drive system shown in FIG. 1. Typically, such security sessions within a disc drive system 100 includes secured communications between the host system 101 and the disc drive 102 sent over interface 103. The interface 103 may be an ATA or SCSI interface. Other memory systems may include MRAM, EEPROM, drive cards, flash memory, or any other storage subsystem adapted to host secure transactions. The storage device may be attached to a host system or may be configured as a stand-alone storage device, which may be connected to a network or embedded as part of a system that has no host or network connections. The network may be a local area network or a wide area network (such as the Internet).

FIG. 2A is a table illustrating a superpacket. A superpacket includes a fixed length header followed by a variable length payload. In general, only one superpacket is contained in any given router packet received by the storage device. In general, a superpacket is a unit of data that can be transferred from host to drive and from drive to host. Each superpacket is moved by a single native interface (such as ATA, SCSI, and the like) command. A superpacket consists of a length of type uinteger (2) followed by a data area of type uinteger(length). The data area (or payload) of the superpacket contains a sequence of one or more packets. The term "length" refers to the number of bytes in the superpacket payload. In general, a superpacket is comprised of multiple commands and/or associated information grouped into a single block, which can be transmitted over the interface between the host and the storage device. By transferring multiple commands in a single block, the first-word latency is experienced only once per block instead of once per command. Thus, first-word latencies are reduced. As used herein, the term "command block" refers to the entire contents being transferred to the storage device over the interface, as opposed to a fixed-length subset of what is being transferred. The command block is sometimes referred to as a payload. The command block can contain both commands and information. In general, the present invention reduces latencies by receiving a plurality of commands in a payload and by processing the entire payload, rather than just a subset of what is being transferred.

FIG. 2B is a table illustrating a packet, one or more of which make up the superpacket payload. Each packet has a fixed length header followed by a packet payload, which contains data and/or commands. Such commands may include remote procedure calls which are allowed to be executed on the storage device. Any number of packets may be included in a superpacket payload. However, a superpacket must fit within a router packet. Moreover, a packet may not span superpackets. Thus, the superpacket block is comprised of a plurality of packets.

A packet is a unit of data transfer for a specific session (or security session). The packet consists of a length of type uinteger(2) followed by a data area (D) of type uinteger. The data area (D) may be encrypted. In some embodiments, the data area (D) is left as unencrypted text. Packet payloads are divided into one or more subpackets. Session is the number of the session to which the packet belongs, and length is the number of bytes in the packet payload.

FIG. 2C is a table illustrating a subpacket according to an embodiment of the present invention. A subpacket consists of a kind of type uinteger(2) followed by a length of type uinteger(2), which is in turn followed by a data area of type uinteger(length). If the most significant bit (MSB) of "kind" is zero (byte=0, bit=7), then the subpacket is a data subpacket, and the 15 least significant bits (LSB)(byte=0, bits={6, 5, 4, . . . , and 0} and byte=1, bits={7, 6, 5, . . . , and 0}) are the destination queue number for the subpacket. The data area or "subpacket payload" contains data bytes to be transferred. If the high order bit (MSB) of "kind" has a value of one, then the subpacket is a control subpacket, and the low order bits or LSBs are a control command number (CCN). The data area or subpacket payload then contains data specific to the CNN.

Flag defines the type of Kind (for example, 0=queue number; 1=command number). Kind is the number of the queue or command of the subpacket. Length is the number of bytes in the subpacket payload.

In general, subpackets have fixed length headers followed by a payload. Subpackets fit entirely within a packet (and do not span packets). A subpacket may either define some data to load into a session queue or a single command for a session to execute. In an alternative embodiment, the subpacket payload may be a tokenized data stream.

In general, command transmissions from the host to the drive (or from an entity to the drive in a stand-alone storage system), which are intended for the security subsystem of the storage device, contain payloads. The payloads are organized into a superpacket, containing one or more packets, each of which contains one or more subpackets. Each subpacket typically contains a single command, though some commands have data that spans more than one subpacket.

If a single command is sent from the host, it would arrive at the security subsystem in a single router packet with a header as shown in FIG. 3. The superpacket contains a superpacket header followed by a packet header followed by a subpacket header, which is followed by the subpacket payload.

Conceptually, the superpacket can be thought of as a block formed from a plurality of packets and subpackets. The block can be transmitted over the interface, and the packets and subpackets can be extracted from the block to retrieve individual commands for execution. In the present invention, the storage device includes a processor for extracting individual commands from the received command block. In one embodiment, each superpacket (command block) contains a plurality of commands and associated information for processing on the storage device. As used herein, the term "extract" refers to a process of parsing or unpacking the command block to expose each individual command of the command block for processing by the processor on the storage device. In a preferred embodiment, the command block is formed from a plurality of commands, and the processor on the storage device extracts each of the plurality of commands from the command block. A session manager can then associate each command with a particular transaction, such as a security session.

FIG. 4 is a table illustrating a method status message according to an embodiment of the present invention. The method status message is a subpacket that communicates to the recipient the current status of the session. This subpacket is also the storage device's response to the host system for many other commands. The method status message provides flow control by telling the recipient how many session buffer bytes are available to receive new subpackets. The recipient may only send bytes in future messages for which the recipient receives "credit". The credit includes header and payload bytes. Hosts may assume that no credit is need for the Status command since it is not copied to a session buffer, but credit must be received before sending any other command (or the command will be ignored). The storage device response is in the same format as the command.

In general, the data structure discussed with respect to FIG. 2A through FIG. 4 illustrate various forms in which commands are received and delivered to the storage subsystem.

Figure 5:
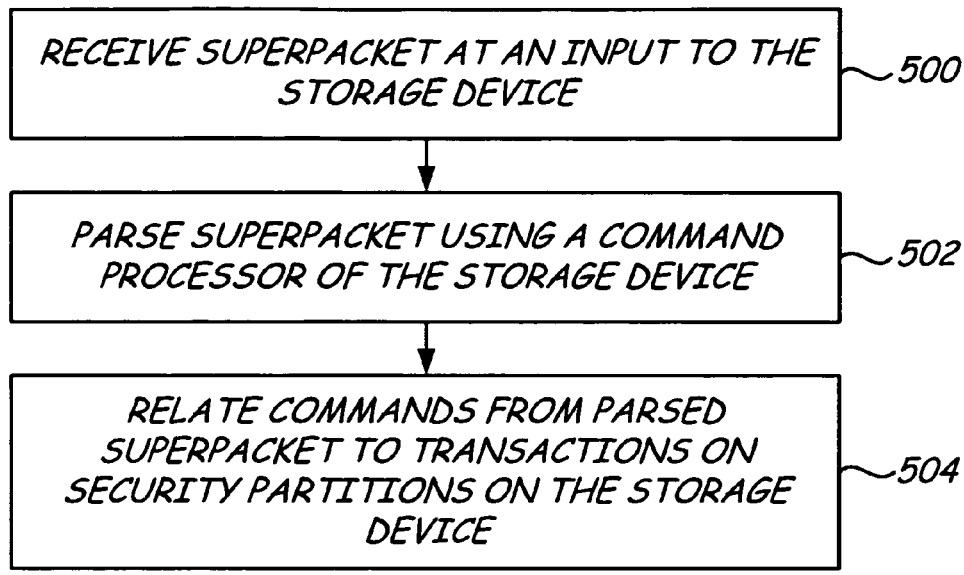
FIG. 5 is a simplified flow diagram of a technique for processing a superpacket on the storage device.

FIG. 5 is a simplified flow diagram of a process for improving communications between a host and security partitions on a storage device. A superpacket is received at an input to the storage device (block 500). In one embodiment, the superpacket is received over the interface (indicated by reference numeral 103 in FIG. 1). As previously discussed, the superpacket contains a block of security functions transferred via a single command payload by a host system to the storage device. The superpacket is parsed by a processor (or command processor) of the storage device (block 502). It should be understood that the processor is within the storage device and may be included in the storage device electronics. In one embodiment where low-latencies and more processing power is needed, the processor is an application-specific integrated circuit operating in conjunction with a central processing unit. The parsed commands are then associated with (related to) transactions on security partitions on the storage device (block 504). It should be understood that the transaction itself may be a security session between an entity and the storage device. For example, a security provider, such as a Microsoft cryptographic service provider (CSP), may be installed in the security partition of the storage device. A secure transaction may then be hosted by the MS CSP in the security partition. Commands and information for the security session can be transferred to the storage device in the payload of the superpacket, parsed by the command processor, and delivered to the appropriate session by a session manager.

Figure 6:
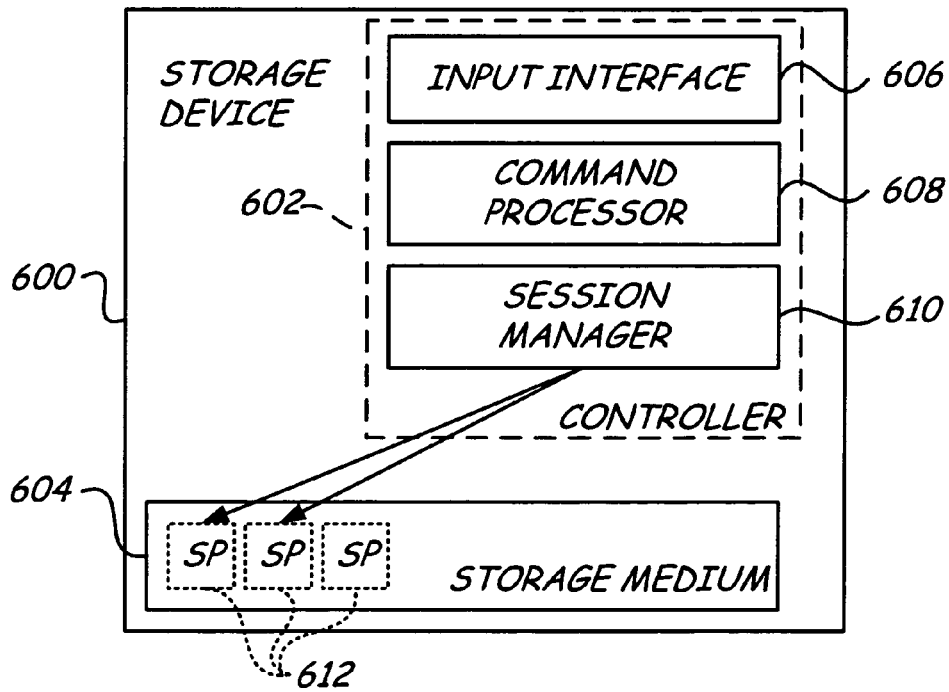
FIG. 6 is a simplified block diagram of a storage device according to an embodiment of the present invention.

FIG. 6 illustrates a simplified block diagram of a storage subsystem 600 according to an embodiment of the present invention. The subsystem 600 includes a controller 602 and a storage medium 604. The controller is generally adapted to control flow of data between, for example, a host system (such as reference number 101 in FIG. 1) and the storage medium 604 via an interface 606. The input interface 606 is intended to represent the communications circuitry adapted to coupled to an interface between a host system and the storage device. The controller 602 includes the input interface 606 adapted to receive superpackets, a command processor 608 adapted to parse received superpackets, and a session manager 610 adapted to deliver security session related information and functions to the appropriate security partitions 612. The arrows connecting the session manager 610 to the security partitions 612 are intended to show that the session manager 610 can manage multiple, simultaneous security transactions on selected security partitions. Finally, a facility is provided on the storage device for executing remote procedure calls within the security session (shown in FIGS. 7, 8A and 11B).

In general, a single command payload (contained in a superpacket) is received by the input interface 606 and stored in an input buffer (not shown). The command processor 608 processes the received superpacket, parsing the superpacket to retrieve subpackets associated with one or more security partitions on the storage device. The session manager finds the open session or opens a new session and directs the subpacket information to the appropriate session for further processing.

Figure 7:
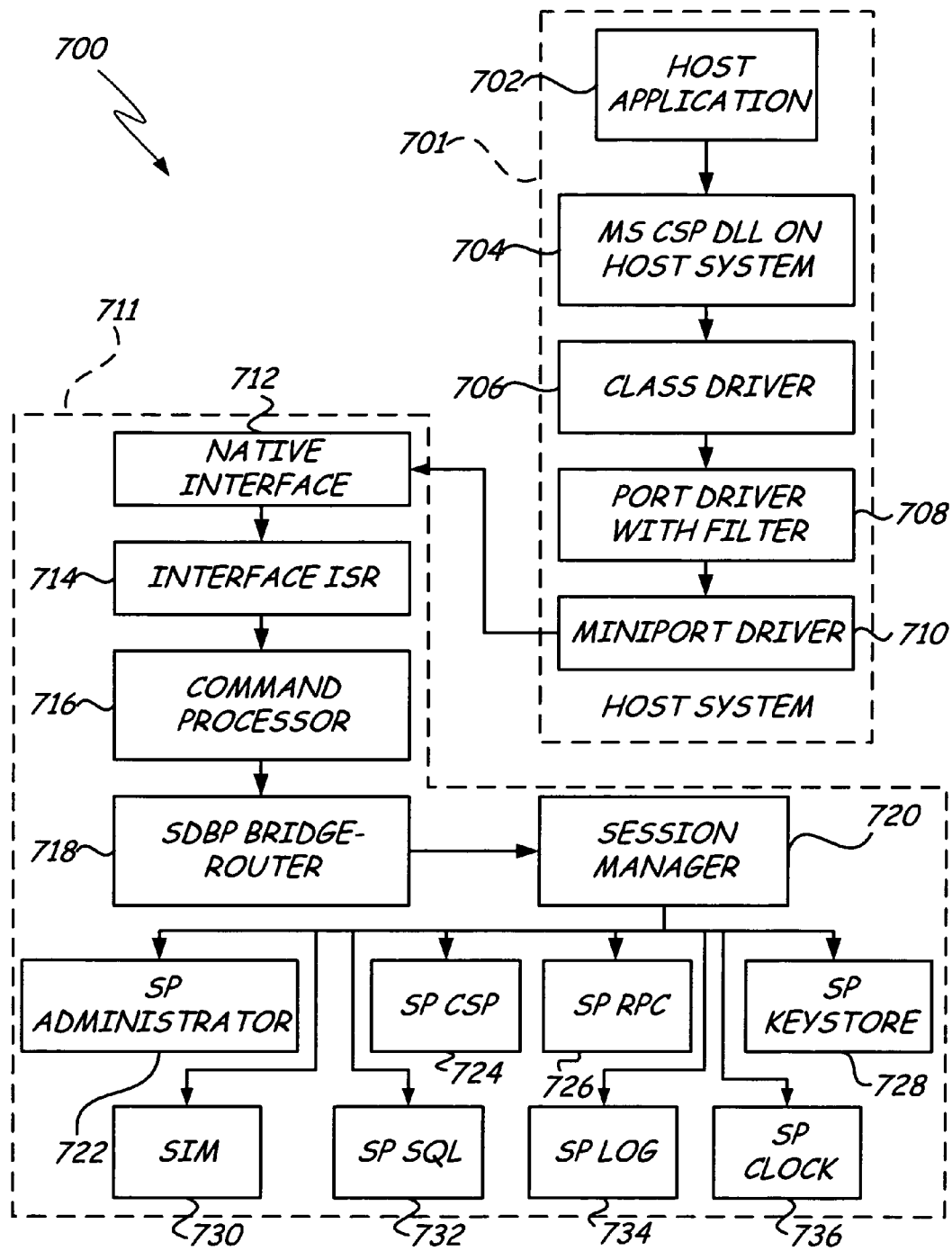
FIG. 7 is a simplified block diagram of components involved in a security partition session according to an embodiment of the present invention.

FIG. 7 illustrates an overview of a scenario in which a single command payload (superpacket, packet and subpacket) transfers a block (or payload) of security functions to a storage system. The command set and transmission protocol is adapted to receive a complex set of commands in a single payload, which is transferred from the host to the drive. The architecture 700 includes a host system 701 and a storage device 711. The host system 701 includes a host application 702, a MS CSP dynamic link library (DLL) 704, a class driver 706, a port driver with a filter 708, and a miniport driver 710. Data from the host application 702 is passed to the storage device 711, via the MS CSP DLL 704, class driver 706, port driver 708 and miniport driver 710 and over a communication link (a cable, wireless connection or some other communication medium).

The storage device 711 receives the superpacket via a native interface 712, which writes the packet to an input buffer (not shown). An interrupt service routine (ISR) interface 714 is adapted to interrupt the command processor 716 when a superpacket arrives at the native interface 712. The command processor 716 is adapted to parse the superpacket, to determine that a command is intended for the security subsystem, and to pass each security function from the superpacket payload via a transport layer protocol, for example, a transfer protocol 718 (such a Seagate Diagnostic Bridge Protocol developed by Seagate Technology LLC) to the session manager 720. The session manager 720 is adapted to manage all security session activity for multiple, simultaneous security session on a storage device. Generally, each security session corresponds with one or more security partitions on the storage device. The session manager 720 accesses various data and software objects on the storage device including a security partition (SP) administrator object 722, an SP MS CSP object 724, an SP remote procedure call (RPC) object 726, an SP keystore 728, a system information manager (SIM) 730, an SP structured query language (SQL) object 732, an SP log 734 and an SP clock 736.

The session manager 720 makes use of the SP administrator 722 to execute remote procedure calls using the SP RPC 726 within a security session. The SP CSP 724 and the SP Keystore 728 are accessed to encrypt and decrypt data within the security session. The SP SQL object 732 is utilized to access hidden spaces on the storage medium. The SP log object 734 is utilized by the session manager 720 to record security session and security partition transactions. Finally, the SP clock 736 is utilized to maintain a sense of time within the security partition (and more particularly within a security session) for detecting excessive time or time-out type conditions.

Once the session manager 720 receives a command, the session manager 720 directs the command to the appropriate security session and security partition. The various security partition objects 722 through 736 are utilized by the session manager 720 to access a security partition, to deliver the commands and associated information and so on.

The present invention enhances the capabilities of host-based application programs, simplifies program steps, and controls the sequence or ordering of a series of complex operations involving multiple security partitions or drive parts on the storage subsystem. In particular, the session manager 720 of the present invention makes it possible to process blocks of functions in a single payload within the drive. This allows commands to be sent over the interface in a single payload, thereby reducing latencies.

The session manager 720 is implemented on the drive side (as opposed to the host side) and is responsible for managing all security session activity for multiple, simultaneous sessions. The session manager works closely with a platform firmware task manager to allocate processor time to various co-routines.

Figure 8A:
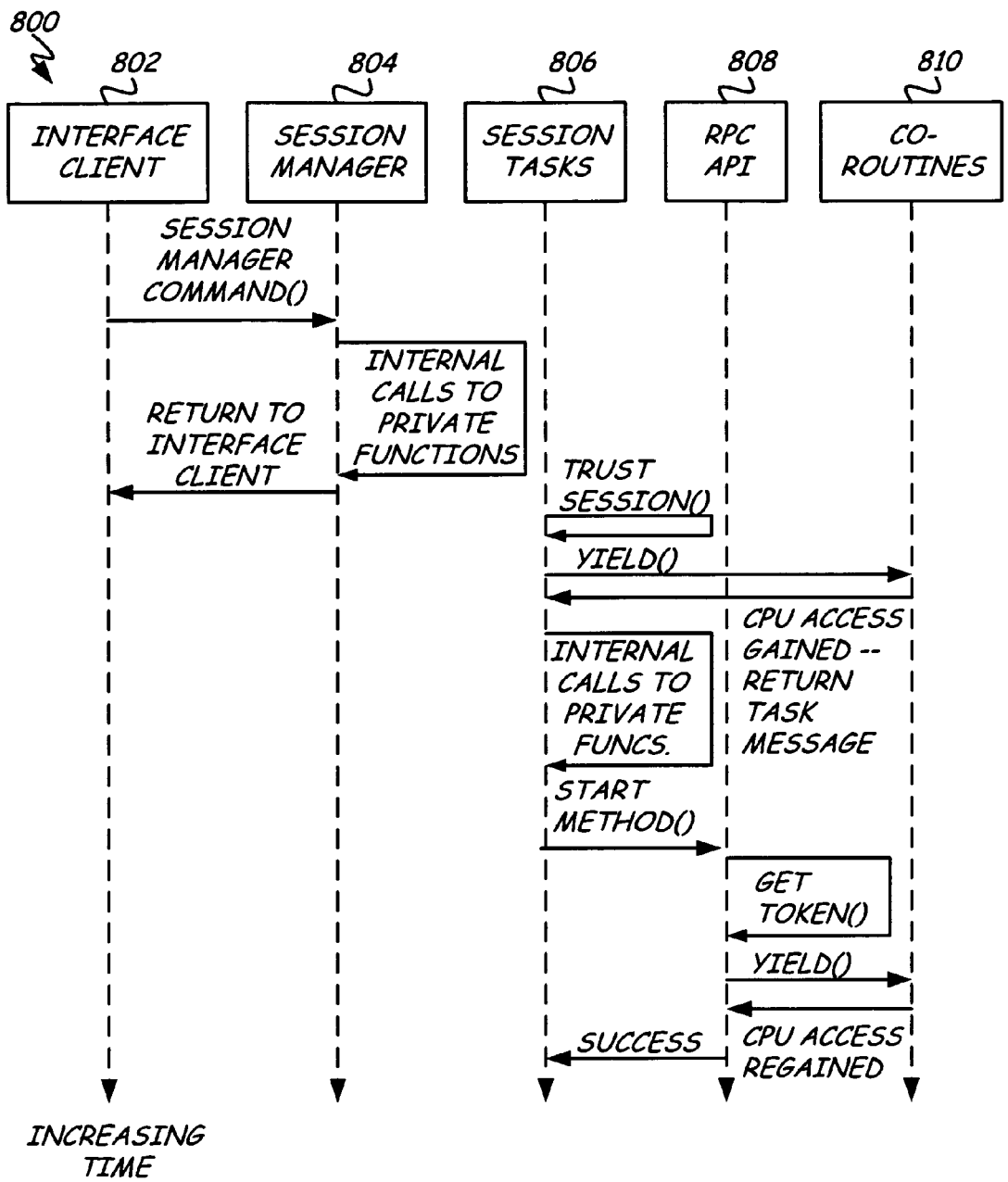
FIGS. 8A and 8B illustrate a command-level timing diagram of a method for processing a single command payload.
Figure 8B:
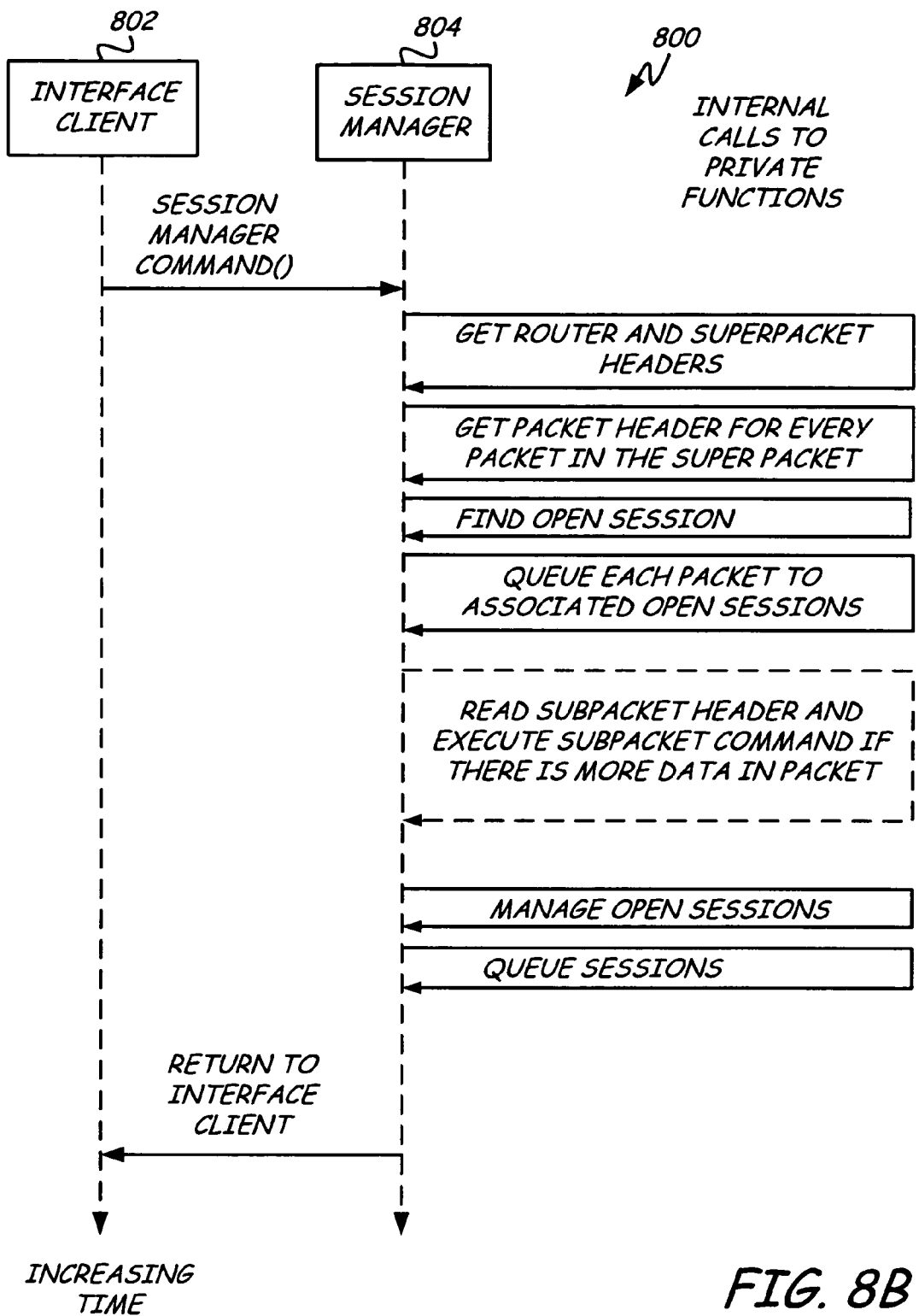

FIGS. 8A and 8B illustrates command level timing diagram of a process for handling a single command payload transfer of a block of security functions to a storage device. The diagram provides an overview of the scenario in which a single command payload (superpacket, packet, and subpacket) transfers a block of security functions to drive. In this example, the superpacket has already arrived at the interface. The super packet contains one or more packets, and each packet pertains to a single session. Each packet contains one or more subpackets, each of which contains a single command. For simplicity, much of the detail has been omitted from FIG. 8A.

Upon receiving the command payload, the interface client 802 calls a session manager 804 to parse the subpacket, using a session manager command which is a public application programming interface command that is accessible to the interface. The session manager 804 calls a number of private functions. For example, the session manager 804 reads the router header and the superpacket header. The session manager 804 then retrieves the packet header for each packet in the superpacket. The session manager 804 then tries to find an open session for each packet and, if a related session is found, the session manager 804 queues the packet to that related session. The session manager 804 then reads the subpacket header and executes the subpacket command for each subpacket in the routed packet payload. If the session is not open already, an error message may be returned.

If all available security sessions are active, the session manager 804 may generate an error message and issue zero credit. If there are session slots available, but the session is not open, the system reserves an unopened session for the user and routes the packet to session tasks. In general, the number of available security sessions may be a pre-configured limitation or a resource limitation, depending on the particular implementation. The session manager 804 then returns status information, conditional output data, and/or credits to the interface client.

The session manager 804 initiates a trust session, which wakes up after the CPU access is gained from the yield call to the co-routines 810 (co-routines may be other security sessions or other active processes). The session manager reads the subpacket info for each subpacket in the session-related packet using a call to stream utilities. The session manager initiates the start method command (a remote procedure call) to the RPC API 808, and dequeues each subpacket into the session scratch buffer. The session manager 804 then initiates a get token function, and decodes each token from the subpacket and processes them. The start method command may be, for example, a new session command, a close session commend, start method, end method, start transaction, authenticate session, and so on. The get token function may repeatedly call a readstream function to parse the subpacket for the command and may also call the yield function and/or yield the CPU temporarily to high priority functions. If any bad tokens are encountered, the session manager returns an error code; otherwise, a success code is returned. In general, the session manager 804 accesses the various commands and procedures as session tasks 806.

FIG. 8B illustrates some of the internal function calls in greater detail. Once the superpacket arrives at the interface, the interface client 802 calls the session manager 804. The session manager 804 reads the router header and the superpacket header. The session manager 804 then retrieves the packet header for each packet in the superpacket. The session manager then tries to find an open session for each packet and, if a related session is found, the session manager queues the packet to that related session. If there is more data to be read, the session manager reads the subpacket header and payload for each subpacket in the superpacket. The session manager then manages all open sessions (returning an error if no more sessions are available, reserving a session, and otherwise directing resources to the various routines). Data from the payload (and commands from the payload) are queued to the appropriate session (once a session is found or a new session is established).

Figure 9:
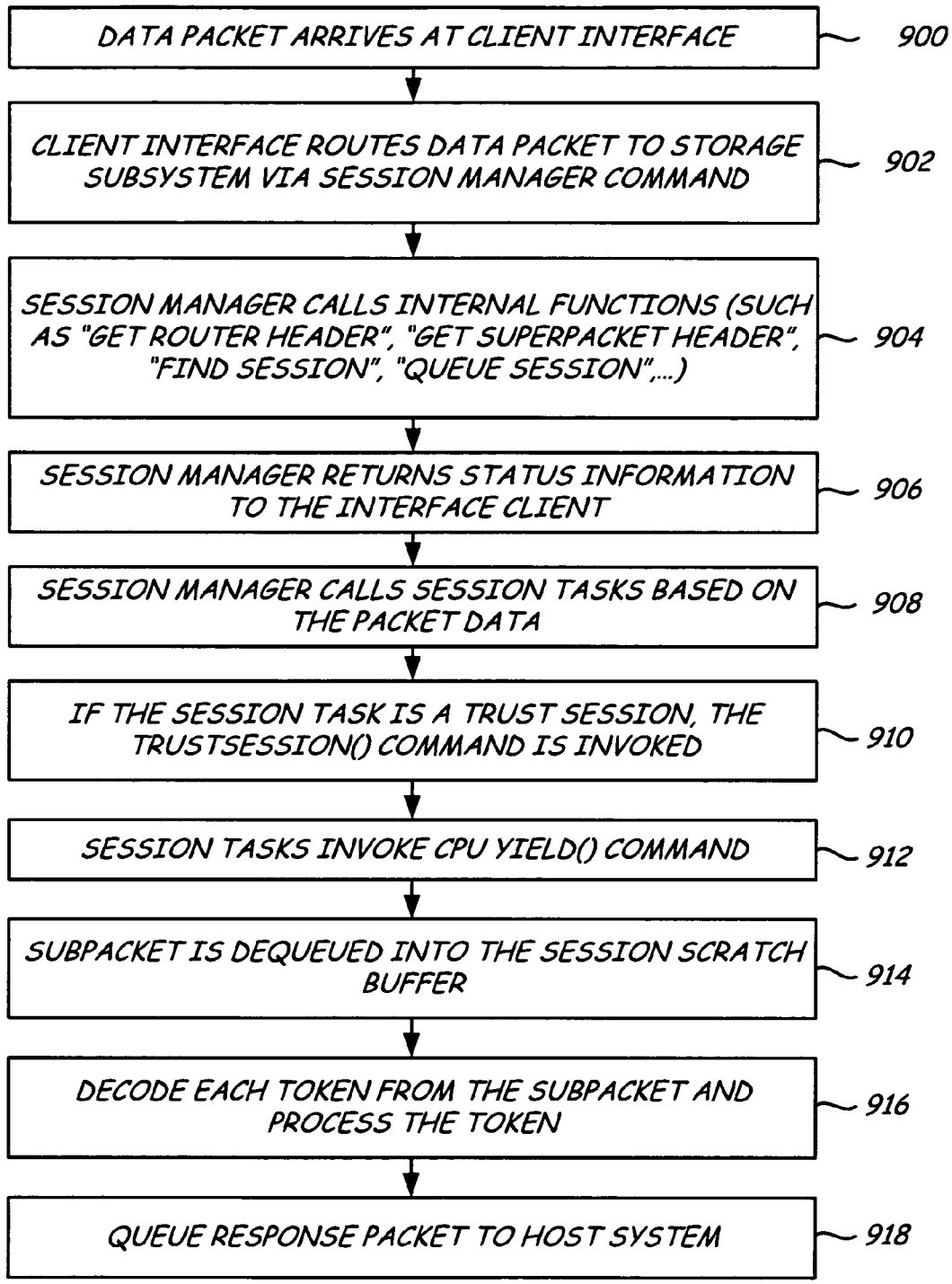
FIG. 9 is a simplified flow diagram of the method of FIGS. 8A and 8B.

FIG. 9 illustrates a simplified flow diagram of a technique for processing a block of security functions with a microprocessor of a storage device. A data packet arrives at the client interface (block 900). The client interface routes the data packet to a storage subsystem via a session manager command (block 902). The session manager calls internal functions (such as "get router header", "get super packet header", "find sessions", "Queue sessions", and so on) (block 904). The session manager returns status information to the interface client (block 906).

The session manager calls session tasks based on the packet data (block 908). If the session task is a trust session, the trust session command is invoked (block 910). The session manager invokes a Yield command to gain access to the CPU through the session tasks (block 912). The subpacket is dequeued into the session scratch buffer. Each token from the subpacket is then decoded and processed. A response packet (success or fail) is queued to the host system.

Figure 10:
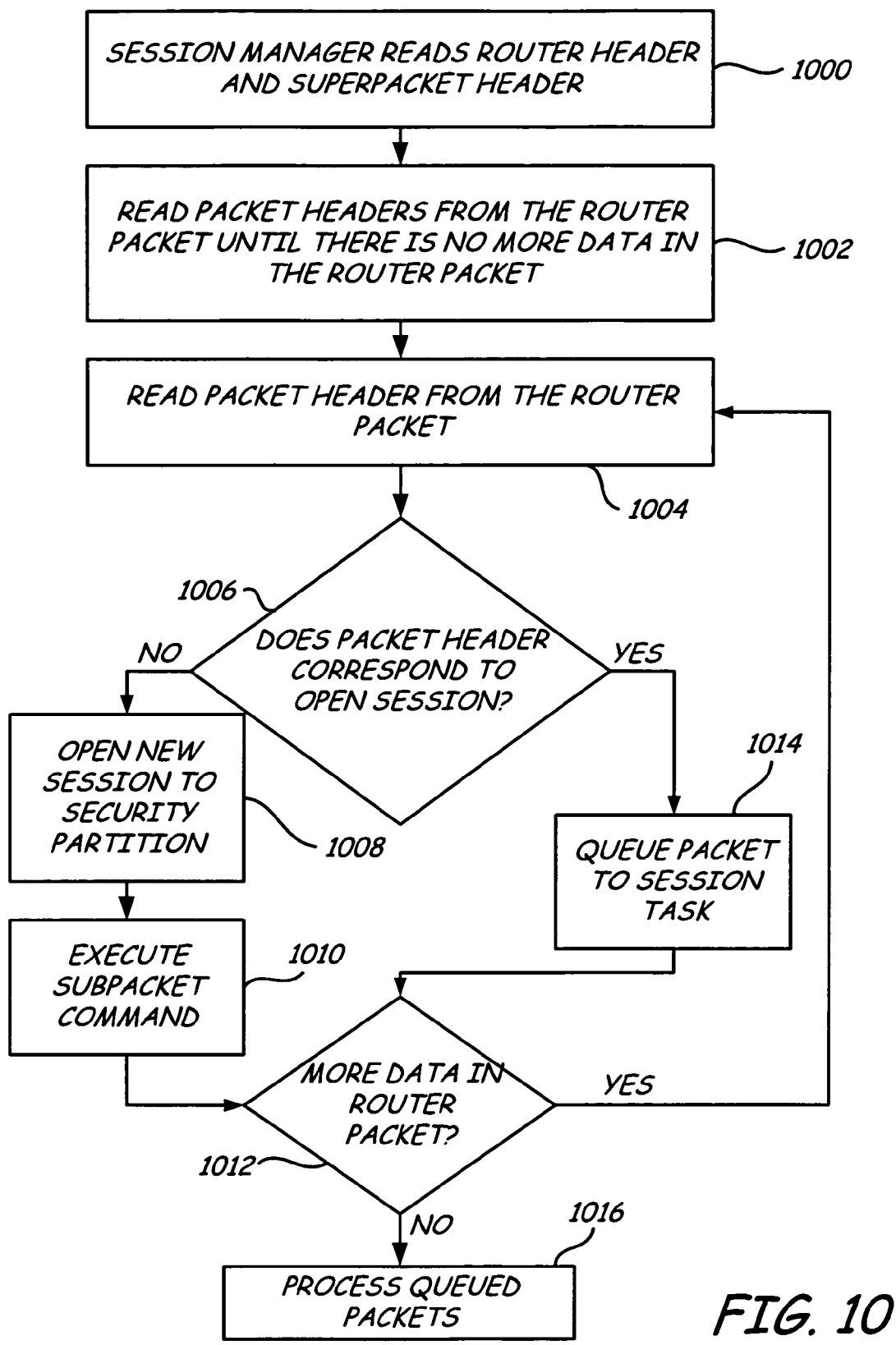
FIG. 10 is a simplified flow diagram of a methodology for processing a superpacket according to an embodiment of the present invention.

FIG. 10 illustrates a simplified flow diagram of a technique for unpacking the superpacket. The session manager reads router header and superpacket header information from the superpacket (block 1000). The session manager reads each packet header from the router packet until there is no more data in the router packet (block 1002). The packet is read by the session manager from the router packet (block 1004). The system then tests if the packet header corresponds to an open security session (block 1006). If not, the session manager opens a new session to a security partition (block 1008) and executes each command of the subpacket (block 1010). If there is more data in the router packet (block 1012), the session manager reads the next packet header from the router packet (block 1004). If the packet header corresponds to an open session (1006), the packet is queued to the appropriate session task (block 1014). Again, if there is more data in the router packet (block 1012), the session manager reads the next packet header from the router packet (block 1004). If there is no more data in the router packet (superpacket), the session manager then processes the queued packets (block 1016).

Figure 11A:
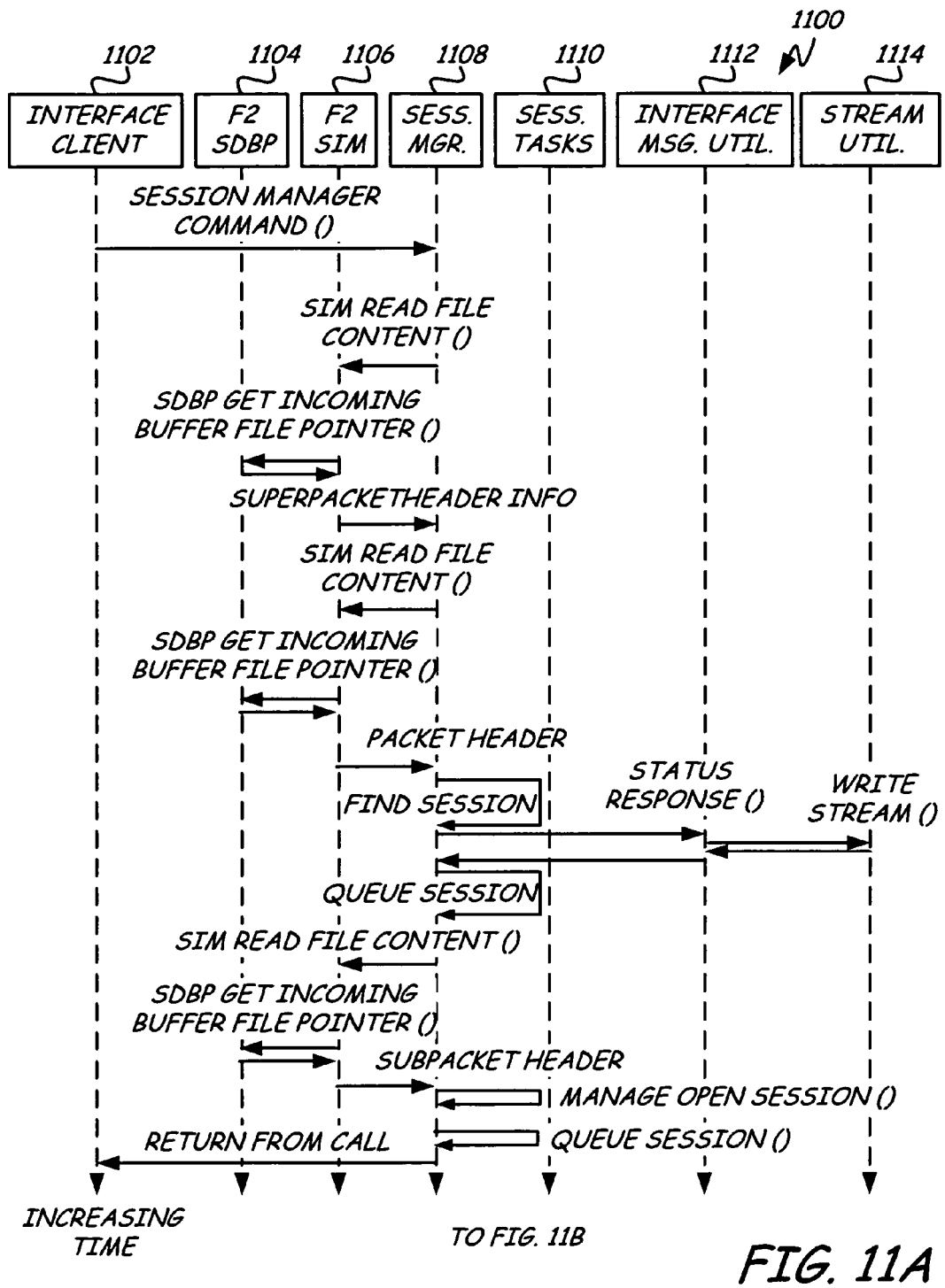
FIGS. 11A and 11B represent a command level timing diagram
Figure 11B:
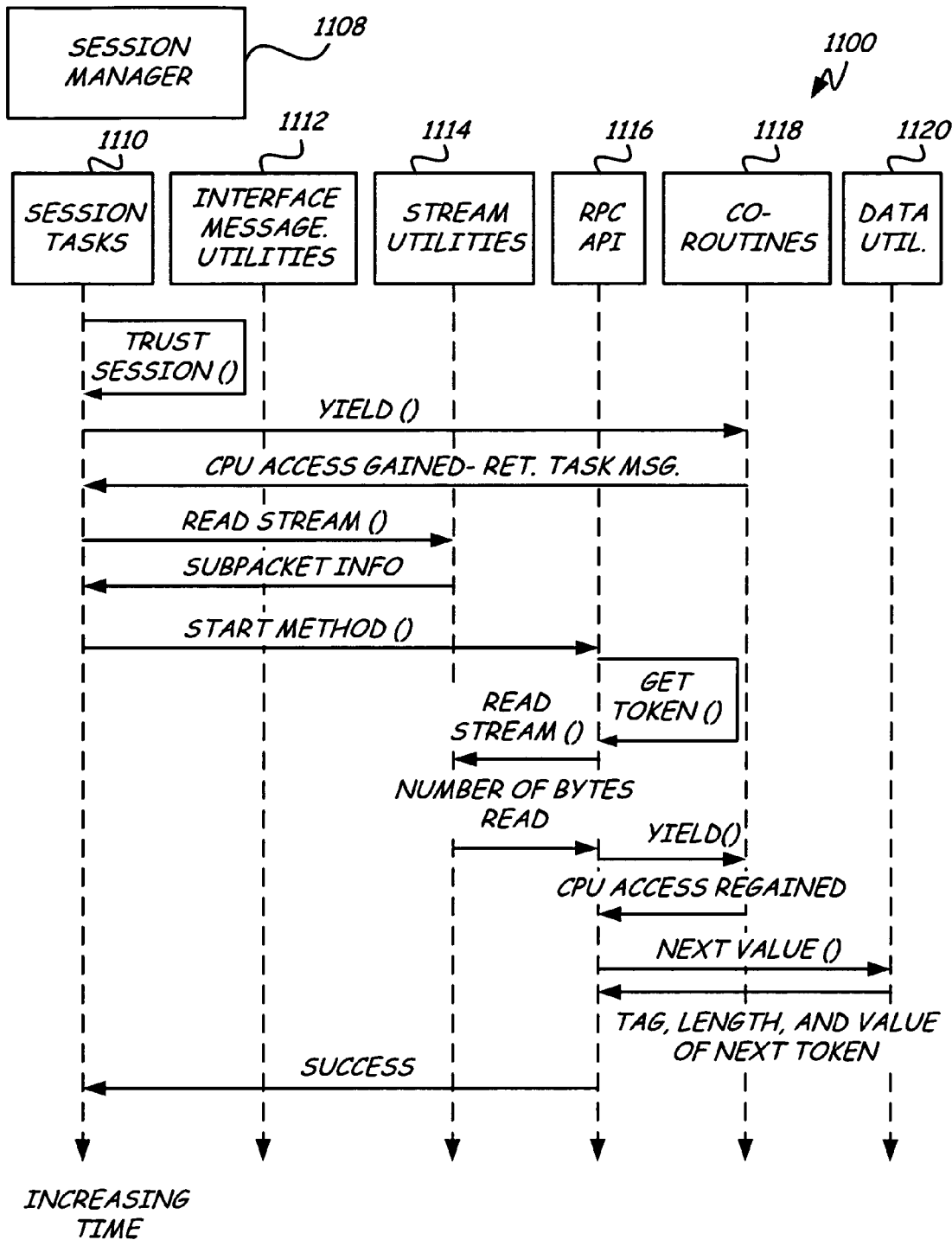

FIGS. 11A and 11B illustrate a more detailed command level timing diagram of a technique for decoding a superpacket according to an embodiment of the present invention. In this embodiment, a single command payload (including a superpacket, packet and subpacket) transfers a block of functions to the storage device. The superpacket has already arrived at the interface. The interface client (command processor) 1102 calls the session manager 1108. The session manager 1108 calls the system information manager (SIM) 1106 to read content from a hidden area on the storage medium. The SIM 1106 calls the transport layer, for example, a Seagate Diagnostic Bridge Protocol (SDBP) 1104 to retrieve the incoming buffer file pointer ( ). The SDBP 1104 returns the pointer, and the SIM 1106 returns the superpacket header information to the session manager 1108. The process is repeated to retrieve the packet header.

The session manager 1108 then tries to find the session associated with the packet header. If the session is found, the session manager 1108 generates a status response command to the interface message utilities 1112. The interface message utilities 1112 open a write stream via a function call to the stream utilities 1114. Once the stream is opened, the packet information is queued to the found session. The session manager 1108 then calls the SIM 1106 to read the file content of the payload for the packet. The SIM 1106 calls the SDBP 1104 to retrieve the pointer, and the SIM 1106 returns the subpacket header information to the session manager. The session manager 1108 then processes the subpacket, manages the open session and queues commands and information from the subpacket to the session.

Turning now to FIG. 11B, the session manager 1108 invokes a trust session with session tasks 1110. The trust session function triggers a yield call to the co-routines 1118. The trust session wakes up upon receipt of the return task message indicating that CPU access is regained. The session manager then causes the payload data or stream to be read via a call to the stream utilities, and the subpacket information is returned. The method associated with the subpacket command is called (here "StartMethodo" is called) by a function call to the RPC API 1116 (remote procedure call application programming interface 1116). The RPC API 1116 retrieves a token associated with the subpacket, reads the stream via a call to the stream utilities, which returns a number of bytes read. The RPC API 1116 then requests CPU access via a yield function call to the co-routines 1118. Once the CPU access is regained, the RPC API 116 retrieves the next token value from the data utilities 1120, which provides a tag, length, and value of the next token or credit. The RPC API 1116 then returns a success flag to the session manager.

This process can be repeated as many times as necessary to completely unpack, decode and process a block of security functions. Moreover, the session manager 1108 is adapted to manage a plurality of simultaneous security sessions, each security session accessing a different partition on the storage device. Calls from the session manager to the systems information manager make it possible for the session manager to invoke internal functions without exposing information to a spy or Trojan horse type application. Specifically, the session manager 1108 calls an internal read file content command, invoking a private function of a system information manager 1106 to retrieve the data, rather than accessing the data directly. Thus, data processing can be handled on the drive-side without jeopardizing data security.

In one embodiment, the function call by the session manager 1108 to the system information manager 1106 causes the system information manager 1106 to retrieve or dynamically assemble a root key for encrypting data returned to the session manager. In this way, no unencrypted data is exposed to an unauthorized user.

In some instances, requests for access to co-routines may require the system to yield access to the CPU temporarily, and return access from the CPU when there is a message to process. In some instances, the system will repeatedly retrieve the token via calls to read the stream to parse subpacket commands. Retrieving the token also results in calls to the CPU to yield temporarily to a higher priority task.

In general, the session manager coordinates processing of the complex set of instructions by retrieving the instructions, parsing the block into individual instructions, routing the instructions to the appropriate subsystem, and coordinating processing for execution according to established priorities. This allows the subsystem to handle multiple simultaneous security sessions.

During the time that a subpacket is being parsed by a read string function, the operating co-routine called yield frequently, so that the task manager can determine whether a higher priority task needs to temporarily gain access to the CPU. A fairness algorithm (not illustrated) ensures that no task is starved and that all tasks get adequate amounts of processor time. In general, the fairness algorithm ensures that high priority tasks receive adequate processing time. The session manager is adapted to terminate sessions or to reject sessions if processor resources are needed by a higher priority task or if processor resources are not available to a new session request. The fairness algorithm operates to balance processor resources among sessions.

In general, the present invention reduces first-word read latencies by processing groups of commands received in a single command payload, rather than by receiving commands over the interface one at a time. In this manner, the storage device is made more efficient than conventional storage devices.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the storage subsystem while maintaining substantially the same functionality without departing from the scope and spirit of the present invention. In addition, although the preferred embodiment described herein is directed to a command transfer protocol and system for transferring a plurality of security functions via a single command payload, it will be appreciated by those skilled in the art that the teachings of the present invention can be applied to any drive-side data script processing or decoding process, without departing from the scope and spirit of the present invention.

What is claimed is:

1. A storage device comprising:

a storage medium;

a processor within the storage device adapted to receive multiple commands as a command block over an interface, the processor adapted to extract each of the multiple commands from the command block for execution on the storage device;
a plurality of security partitions;
a session manager within the storage device adapted to:
host a plurality of security sessions to correspond with the plurality of security partitions;
associate each of the multiple commands with selected security sessions of the plurality of security sessions; and
execute multiple, simultaneous security transactions on the selected security partitions.

2. The storage device of claim 1 wherein the command block comprises a header having information about the command block and a single payload comprising the plurality of commands.

3. The storage device of claim 1 wherein the session manager is adapted to route information associated with the at least one of the multiple commands to the associated security session.

4. The storage device of claim 1 wherein the session manager is adapted to control an order of execution of the multiple commands.

5. The storage device of claim 1 wherein a security session comprises:
a secured transaction between the storage medium of the storage device and a device external to the storage device.

6. The storage device of claim 1 wherein the storage medium comprises:
multiple storage cards having one or more security partitions on at least one of the multiple storage cards.

7. A method for processing commands on a storage device, the method comprising:
receiving on the storage device a command block comprising a plurality of commands in a single payload received from an external device over an interface; and
extracting each of the plurality of commands from the command block using a command processor of the storage device;
identifying an open security session based on information contained with an extracted command; and
queuing the extracted command to the open security session when the open security session is identified.

8. The method of claim 7 further comprising:
opening a new security session when an open security session cannot be identified; and
queuing the extracted command to the new security session.

9. The method of claim 7 wherein before the step of extracting, the method comprises:
invoking the command processor with a function call.

10. The method of claim 7 wherein the storage device comprises a disc drive.

11. A storage device comprising:
a storage medium having one or more security partitions;
a processor within the storage device adapted to extract single commands from a command block comprising a plurality of commands received in a single payload, the processor adapted to process each single command on security sessions associated with the one or more security partitions; and
a session manager executable by the processor and adapted to manage the security sessions on the one or more security partitions and to direct each of the single commands to an associated security session.

12. The storage device of claim 11 wherein the session manager is adapted to implement a fairness algorithm for balancing processing time among a plurality of security sessions so that each of the single commands is assured adequate processor time.

13. The storage device of claim 11 wherein the command block comprises:
a header having information about the command block; and
the payload comprising the plurality of commands.

14. The storage device of claim 11 further comprising:
a set of commands to which the storage device responds, the set of commands stored in a security partition of the storage medium and accessible to a session manager for execution of commands extracted from the command block.

15. The storage device of claim 11 wherein at least one of the single commands comprises a remote procedure call.

* * * * *